United States Patent [19]

Orton

[11] Patent Number: 5,107,387
[45] Date of Patent: Apr. 21, 1992

[54] FUSE-PROTECTED RC CONTROLLER

[76] Inventor: Kevin R. Orton, Tekin Electronics, Inc., 970 Calle Negocio, San Clemente, Calif. 92672

[21] Appl. No.: 622,756

[22] Filed: Dec. 5, 1990

[51] Int. Cl.⁵ .............................................. H02H 7/09
[52] U.S. Cl. ..................................... 361/33; 361/104; 337/187; 337/198; 318/16; 318/139
[58] Field of Search ...................... 361/33, 82, 84, 104; 337/187, 197, 198, 216; 307/127; 318/6, 16, 139, 266, 370, 376, 371, 375, 293

[56] References Cited

U.S. PATENT DOCUMENTS

| | | | |
|---|---|---|---|
| 4,164,726 | 8/1979 | Weibe | 337/215 |
| 4,305,030 | 12/1981 | Lorenz | 318/758 |
| 4,406,982 | 9/1983 | McClellan | 318/139 |
| 4,450,397 | 5/1984 | Painter | 318/375 |

Primary Examiner—Steven L. Stephan
Assistant Examiner—Adolf Berhane
Attorney, Agent, or Firm—Loyal M. Hanson

[57] ABSTRACT

A controller includes a circuitboard with a circuit for variably coupling power from a battery to the drive motor of a radio controlled model. The circuit has positive and negative input terminals for connection to the battery and an output port for connection to the motor. The circuit also includes braking componentry that produces a low resistance path in parallel with the motor in order to brake the motor under operator control, and the circuit includes a fuse in series with the braking componentry for protecting it from damage in the event the input terminals are connected to the battery with the polarity reversed. An inventive fuse is disclosed that may be used with the controller or elsewhere. The fuse includes a conductive element of predetermined current rating and first and second connectors connected to the conductive element that are configured to plug onto first and second terminal posts with interference fits so that any component fatigue is substantially restricted to the fuse. The fuse may be fabricated from separate interconnected components or take the form of a sheet of conductive material that has been stamped and rolled or otherwise shaped into a fuse element. The fuse element may snap into a housing that facilitates handling.

15 Claims, 2 Drawing Sheets

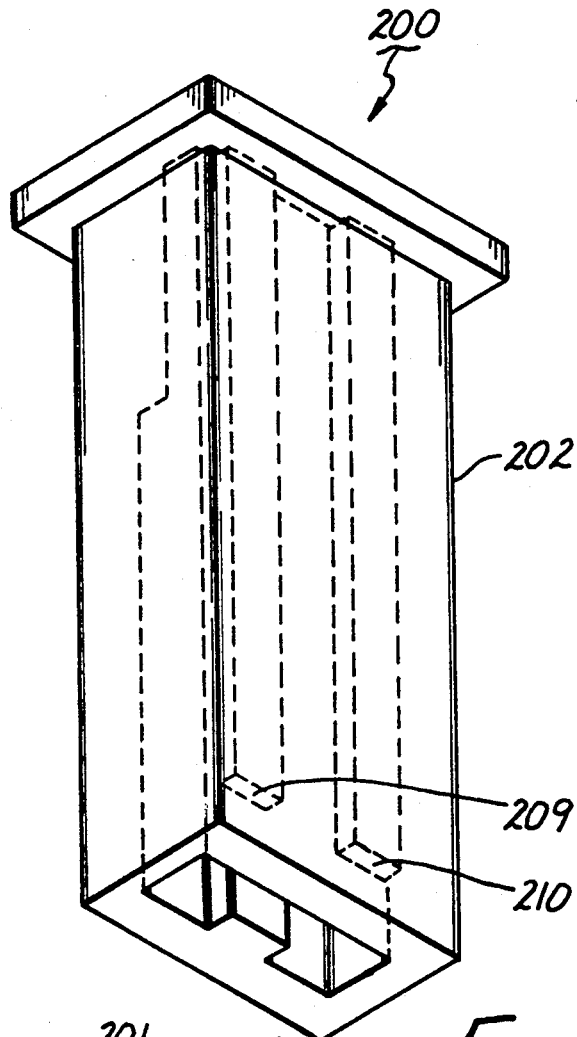
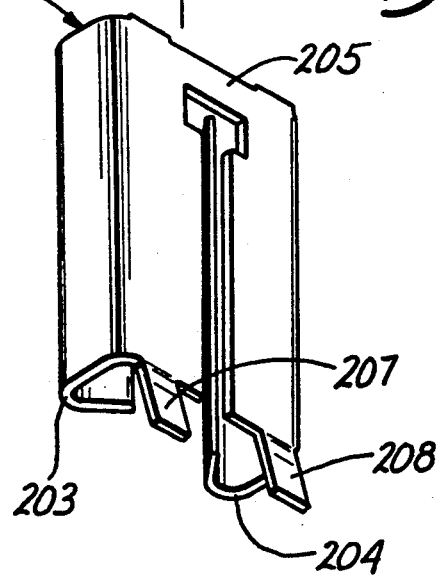
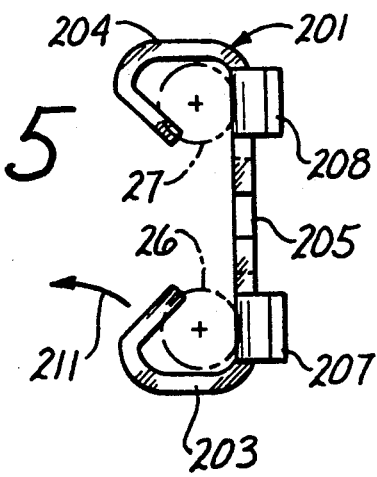
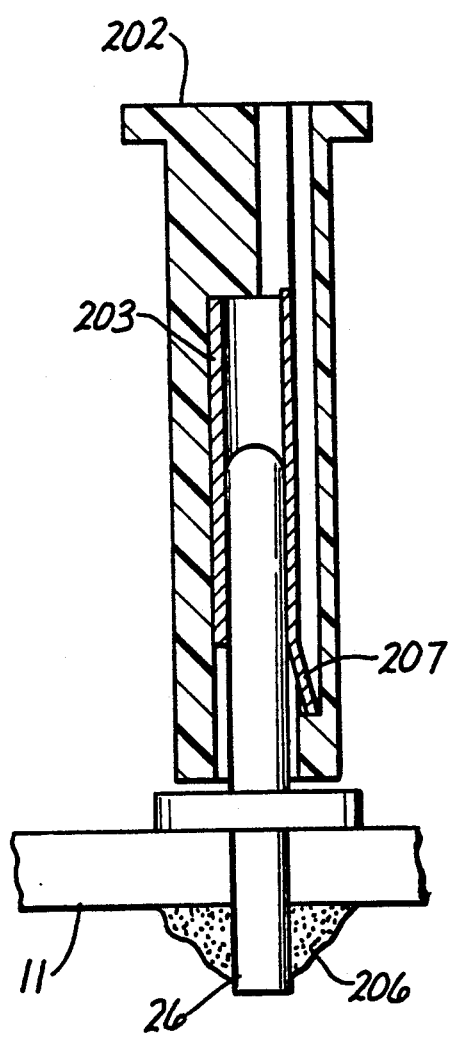

FUSE-PROTECTED RC CONTROLLER

BACKGROUND OF THE INVENTION

1. Technical Field

This invention relates generally to radio controlled (RC) models, and more particularly to a fuse-protected controller for an RC model car.

2. Background Information

A typical RC model car race may have ten or more operators simultaneously racing 1/10 scale RC model cars around a carefully groomed 450 foot track at lap speeds in the 16-second range. But even with a model car fully outfitted and finely tuned, the winner may only edge out the runnerups by a few seconds or less. That, of course, encourages attention to details of RC model car construction and operation in preparation for the next race, and so such competitive activity makes each of those details important.

One detail concerns overall efficiency, especially efficient use of battery power, and RC racing enthusiasts go to great lengths to achieve a one or two percent improvement by such things as fine tuning gear ratios, testing and selecting battery cells, changing armature windings, and so forth. They may even omit fuse protection to avoid fuse bulk and weight and a small voltage drop across the fuse. But doing so can cause problems. When the operator hastily installs the battery just before the race, for example, he may inadvertently reverse polarity and thereby damage the controller beyond use.

To better visualize the problem, consider a typical RC model car. It includes a DC motor for driving the wheels, a nicad battery for supplying power to the motor, and a controller for regulating the flow of power from the battery to the motor according to commands received by radio from the operator. The controller usually includes a complement of electronic components on a small printed circuitboard to which the battery and motor are connected by suitable wiring, and some previous attempts at fusing the RC car employed a fuse in the wiring between the battery and controller. But such an arrangement introduces the undesired bulk, weight, and small voltage drop previously mentioned. So some operators choose to do without a fuse, thereby leaving the controller vulnerable to damage.

Although conceivable to place a fuse on the controller circuitboard in the main power line coupling the controller circuitry to the battery, some existing fuses for printed circuitboards must be soldered in place on the circuitboard. That makes replacement quite inconvenient. Others plug into spring clips on the circuitboard that mechanically grip the fuse while providing electrical contact. But such spring clips can be somewhat bulky as well as being prone to fatigue and eventually fail. Furthermore, existing fuses that are small enough to place on a controller circuitboard may have a current rating that is insufficient for the amount of current needed to power the motor, which may be as much as fifty amperes. Moreover, fusing the main power line still introduces a small, undesired voltage drop. So, racing enthusiasts and other RC operators need a better way to overcome the problem.

SUMMARY OF THE INVENTION

This invention solves the problem outlined above by providing an RC controller that has a pluggable fuse on the controller circuitboard. The fuse is so located that it protects controller components from a reverse polarity battery connection without introducing an undesired voltage drop between the battery and the motor. In addition, one embodiment includes a fuse that has its own spring clips for gripping circuitboard terminals posts. Including them as part of the fuse insures fresh gripping action each time the fuse is replaced.

Generally, a controller constructed according to the invention includes a circuitboard and means defining a circuit on the circuitboard for variably coupling power from a separate battery to the drive motor of a radio controlled model. The circuit has an input port with positive and negative terminals for connection to the battery and an output port with first and second output terminals for connection to the motor. In addition, the circuit includes braking componentry that an operator can control to produce a low resistance path between motor terminals in order to brake the motor.

According to a major aspect of the invention, the circuit includes a first unfused leg electrically coupling the positive input terminal and the first output terminal, a second unfused leg electrically coupling the negative input terminal and the second output terminal, and a fuse in series with the braking componentry. That protects the braking componentry from damage in the event the input terminals are connected to the battery with polarity reversed, and it does so in a way avoiding an undesired voltage drop between the battery and the motor. In other words, the invention recognizes that it is the braking componentry that is vulnerable to damage when the polarity is reversed, so the fuse is advantageously located to protect just that componentry. So locating the fuse avoids introducing an undesired voltage drop.

According to another aspect of the invention, the fuse is configured to grip first and second terminal posts on the circuitboard instead of using clips on the circuitboard that grip the fuse. That arrangement results in fresh gripping action each time the fuse is replaced. In that regard, "interference fit" refers to a fit between two components that plug together in such a way that the more deformable one of the components resiliently deforms slightly to accommodate the other component. The less deformable component may or may not also deform slightly. Depending on the precise arrangement, such a fit may sometimes also be referred to as a force fit, a friction fit, or a snap-together fit.

When a conventional cartridge fuse is plugged or snapped into conventional spring clips, for example, the spring clips resiliently deform and then bear against the fuse to grip it. That is an interference fit. The problem with such an arrangement is that the spring clips tend to fatigue with use and eventually break. So this invention configures the replaceable fuse element so that it does the gripping instead of using deformable clips on the circuitboard.

One fuse embodiment takes the form of two connectors that are configured to plug onto circuitboard terminal posts with interference fits. A length of fuse wire of suitable current rating interconnects them and blows if the current rating is exceeded. Another fuse embodiment includes a fuse element in the form, of a sheet of conductive material that has been stamped and rolled or otherwise shaped to have first and second connector portions connected by a fuse portion. The first and second connector portions plug onto circuitboard terminal posts with interference fits and the fuse portion blows if its current rating is exceeded. Preferably, the fuse also includes a housing into which the fuse element snaps in order to facilitate handling.

BRIEF DESCRIPTION OF THE DRAWINGS

FIG. 3 is a perspective view of a second pluggable fuse showing the fuse element disassembled from the fuse housing;

FIG. 4 is an assembled view of the second fuse shown in cross section and plugged onto terminals on the controller circuitboard; and FIG. 5 is a top view of the fuse element with the circuitboard terminals superimposed in phantom lines.

DESCRIPTION OF THE PREFERRED EMBODIMENTS

Figure 1:
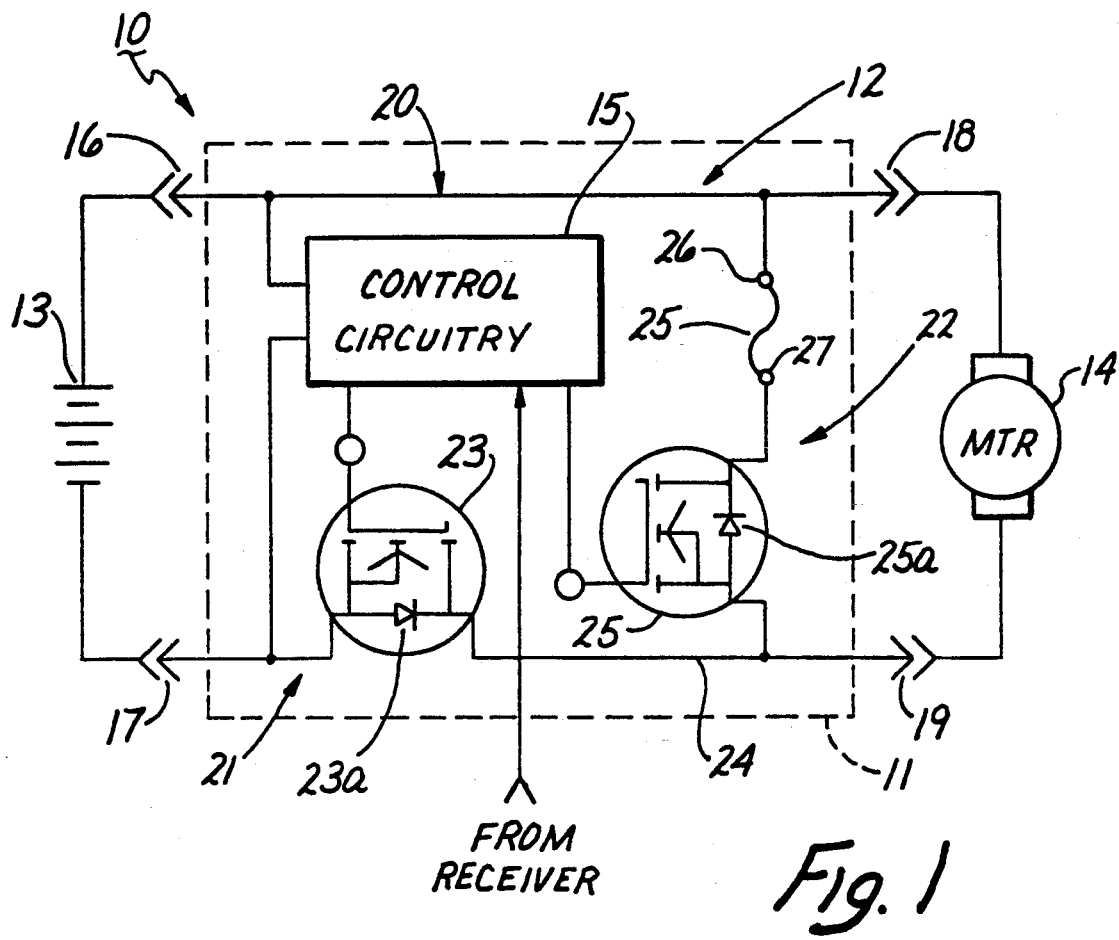
FIG. 1 of the drawings is a schematic circuit diagram of a controller constructed according to the invention.

FIG. 1 of the drawings shows a controller 10 constructed according to the invention. Generally, it includes a circuitboard 11 (shown in dashed lines) on which are mounted the components of a circuit 12. The circuit 12 variably couples power from a nicad battery 13 to the DC drive motor 14 of a radio controlled model such as an RC racing model, doing so under operator control in a manner that is in many ways similar to other existing controllers.

In other words, an operator communicates commands via radio to a receiver accompanying the controller 10 on an RC model (not shown). Those commands are suitably communicated from the receiver to control circuitry 15 (FIG. 1) that is part of the circuit 12, and the control circuitry 15 combines with other portions of the circuit 12 to variably couple power to the motor 14 according to the operator commands That manner of operation is well known and reference may be made to U.S. Pat. No. 5,043,640 for the related details it provides.

Considering the circuit 12 in further detail, it has an input port with a positive terminal 16 for connection to the positive lead of the battery 13 and a negative terminal 17 for connection to the negative lead of the battery 13. It also includes an output port for connection to the motor 14, the illustrated embodiment having first and second terminals 18 and 19 for that purpose. A first unfused leg 20 directly connects the positive input terminal 16 to the first output terminal 18 and it may be a heavy trace on the circuitboard 12 that provides a low resistance path for the relative large current requirements of the motor 14.

Some existing attempts to provide fuse protection placed a fuse either in the first leg 20 or between one of the positive and negative terminals 16 and 17 and the battery 13. But doing so results in an increase in resistance between the battery 13 and the motor 14. That, in turn, produces an undesired voltage drop because of the high current drawn by the motor 14.

The controller 10, however, fuses just the componentry identified as vulnerable to a reverse polarity connection. In that regard, the motor 14 usually remains undamaged by a reverse polarity connection. It just rotates backwards at high speed. As for the control circuitry 15, it derives power from the battery 13, but it can be provided with diode protection against a reverse polarity connection.

Speed control componentry 21 and braking componentry 22 are more vulnerable, however. Considering the speed control circuitry first, it generally includes a bank of several semiconductor devices 23 (e.g., MOSFET's) having substantial current carrying capability. That bank of semiconductor devices combines with the control circuitry 15 to serve as means for varying the resistance of a second unfused leg 24 of the circuit 12 connecting the negative input terminal 17 to the second output terminal 19. Varying the resistance of the second leg 24 varies the amount of power coupled from the battery 13 to the motor 14 and that affects motor speed.

Of course, the resistance of the first leg 20 could be varied instead without departing from the inventive concepts disclosed. But in either case, if the polarity of the battery 13 is reversed, a reverse current flows through diodes 23a within the semiconductor devices and that threatens damage. It turns out, however, that the bank of semiconductor devices 23 has sufficient current carrying capability through the diodes 23a for the current drawn by the motor 14, and so a reverse polarity connection does not damage the speed control componentry 21. As a result, that componentry need not be fuse-protected.

The braking componentry 22 does not use a bank of semiconductor devices, however. It usually includes just one semiconductor device 25 (e.g., a MOSFET) of substantially less current carrying capability. It combines with the control circuitry 12 to serve as means for providing a low resistance path in parallel with the motor 14 in order to brake the motor 14 under operator control. Since the braking circuitry 22 is usually turned ON when the speed control circuitry 21 is turned OFF, the braking circuitry 22 only handles the current flowing back from the motor 14 during braking. As a result, just one device suffices.

But that one device cannot handle the current under a reverse polarity connection. In other words, the diode 25a that is part of the device 25 has too little current carrying capability and so can be more easily damaged. Thus, having identified the braking circuitry 22 as the vulnerable circuitry, this invention protects it with a series connected fuse 25, locating the fuse 25 as illustrated so that it is not in either of the legs 20 and 24 and does not introduce an undesired voltage drop between the battery 13 and the motor 14.

The fuse 25 can take any of various known forms within the broader inventive concepts described above, as long as it includes conductive material that melts, burns, breaks, or otherwise interrupts the flow of current in response to the current exceeding a particular amperage (e.g., a thin metal trace of other fusible material soldered to or otherwise mounted in the circuit). In other words, according to the broader inventive concepts disclosed, the circuit includes "means defining a fuse" in series with the braking circuitry 22, and it is intended that any means employed to perform the fusing function described be considered to fall within the scope of the claims. But according to another aspect of the invention, it plugs onto first and second terminal posts 26 and 27 that are mounted on the circuitboard 11. Moreover, it is advantageously configured in that regard to overcome the problem associated with circuitboard mounted spring clips that are prone to fatigue and eventually break.

Figure 2:
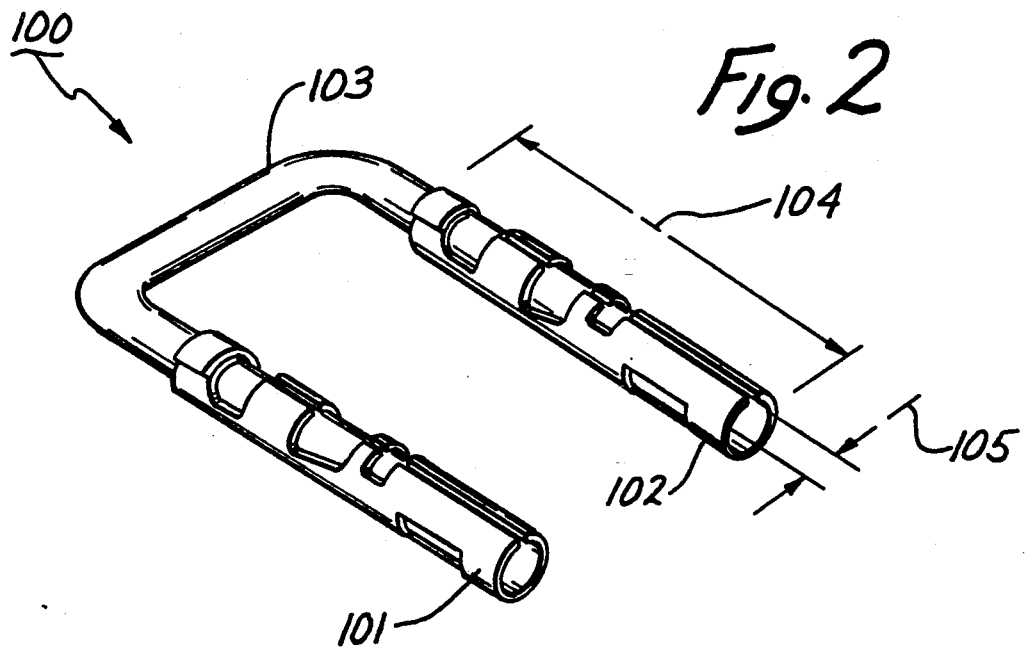
FIG. 2 is a perspective view of a pluggable fuse used in the controller.

One embodiment of a fuse constructed according to that aspect of the invention is shown in FIG. 2. Designated fuse 100, it includes first and second connectors 101 and 102 and a conductive element such as fuse wire 103 interconnecting them. The connectors 101 and 102 may be commercially available miniature connectors of beryllium copper that plug onto commercially available terminal posts mounted on the circuitboard 11, such as the terminal posts 26 and 27 in FIG. 1. Such connectors are available from J.S.T. Corporation of Mount Prospect, Ill. under the part name RCY-CONNECTOR, and as an idea of size, they may be about 0.5 inch long at the dimension 104 in FIG. 2 and have an inside diameter at the dimension 105 of about 0.03 inch.

The terminal posts onto which the connectors 101 and 102 plug have just slightly larger outside diameters, and so the connectors 101 and 102 have to deform slightly when plugged onto such terminal posts. Then they bear against the terminal posts with a gripping action that retains the fuse 100 in place. So the connectors 101 and 102 may be said to constitute means defining first and second connectors connected to the fuse wire 103 that are configured to plug onto first and second terminal posts on a circuitboard with an interference fit.

The fuse wire 103 is a commercially available fuse wire component having a predetermined current rating (e.g., 50 amperes) and the first and second connectors are so connected to the fuse wire 103 the fuse wire 103 blows if the amount of current passing through it from the first connector 101 to the second connector 102 exceeds the predetermined current rating. For that purpose, the connectors 101 and 102 may be crimped or soldered onto opposite ends of the fuse wire 103 in a known way. If the fuse 100 blows, the operator grasps it and unplugs it from the terminal posts 26 and 27 with a slight tug. Then the operator discards the blown fuse and plugs in a replacement fuse, thereby replacing the connectors that grip the terminal posts. With such an arrangement, the operator can even make replacement fuses as needed.

A second embodiment of a pluggable fuse constructed according to the invention is shown in FIGS. 3-5. Designated fuse 200, it includes a fuse element 201 that removably mounts within a housing 202 to facilitate handling. Like the fuse 100, the fuse 200 includes first and second connector portions 203 and 204 and a blowable portion 205 interconnecting them. The connector portions 203 and 204 may be said to constitute means defining first and second connectors connected to the blowable portion 205 that are configured to plug onto first and second terminal posts on a circuitboard (i.e., the terminal posts 26 and 27 on the circuitboard 11) with an interference fit. The blowable portion 205 is configured to have a predetermined current rating (e.g., 50 amperes), and the first and second connectors 203 and 204 may be said to be so connected to the blowable portion 205 that the blowable portion 205 blows if the amount of current passing through it from the first connector portion 203 to the second connector portion 204 exceeds the predetermined current rating.

Unlike the fuse 100, the fuse 200 is stamped and rolled or otherwise formed from a sheet of conductive material in unitary one piece construction, from a 0.250 by 0.340 inch sheet of 0.007 inch thick beryllium copper alloy, for example. That is done so that the blowable portion 205 has the predetermined current rating and so that the connector portions 203 and 204 plug onto the terminal posts 26 and 27 with an interference fit.

FIG. 4 shows the terminal post 26 attached with solder 206 to the circuitboard 11 and the connector portion 207 of the fuse 200 plugged onto the terminal post 26. The fuse element 201 is shown removably mounted in the housing 202. For that purpose, the fuse element 201 includes resiliently deformable tabs 207 and 208 (FIGS. 3-5) that snap into recesses 209 and 210 in the housing 202 (FIG. 3). As a further idea of size, the housing may be formed of a plastic material so that it measures about 0.5 inch high. Of course, that dimension is not critical, but it does facilitate handling of the fuse element 201 for purposes of plugging and unplugging the fuse 201 onto the terminal posts 26 and 27.

As the fuse 200 is plugged onto the terminal posts 26 and 27 (shown in phantom lines in FIG. 5), the connector portions 203 and 204 resiliently deform slightly, as shown in FIG. 5 for the connector portion 203 by an arrow 211. In that sense, the connector portions 203 and 204 plug onto the terminal posts 26 and 27 with interference fits. So, the spring action is derived from the fuse and not clips on the circuitboard. In order to replace the fuse 200, the operator grasps it and with a slight tug unplugs it from the terminal posts 26 and 27. Then a replacement fuse 200 is plugged back onto the terminal posts 26 and 27. If desired, the fuse element 201 can be removed from the housing 202 and a replacement fuse element snapped back into the housing in order to reuse the housing 202.

Thus, the invention provides an RC controller that has a pluggable fuse on the controller circuitboard. The fuse is so located that it protects controller components from a reverse polarity battery connection without introducing an undesired voltage drop between the battery and the motor. In addition, one embodiment includes a fuse that has its own spring clips for gripping circuitboard terminals posts, and that results in fresh gripping action each time the fuse is replaced.

Although an exemplary embodiment has been shown and described, many changes, modifications, and substitutions may be made by one having ordinary skill in the art without necessarily departing from the spirit and scope of the invention.

What is claimed is:

1. An RC controller, comprising:
   a circuitboard, and
   means defining a circuit on the circuitboard for variably coupling power from a battery to the drive motor of a radio controlled model;
   the circuit having an input port that includes a positive input terminal for connection to the positive terminal of the battery and a negative terminal for connection to the negative terminal of the battery;
   the circuit having an output port that includes first and second output terminals for connection to the motor;
   the circuit having a first unfused leg electrically coupling the positive input terminal and the first output terminal;
   the circuit having a second unfused leg electrically coupling the negative input terminal and the second output terminal;
   the circuit including means defining braking componentry connected across the output terminals for electrically coupling the output terminals with a low resistance path in parallel with the motor in order to brake the motor under operator control; and
   the circuit including means defining a fuse in series with the braking componentry for protecting the braking componentry from damage in the event the input terminals are connected to the battery with the polarity reversed.

2. An RC controller as recited in claim 1, wherein the means defining a fuse includes a fuse that is pluggable.

3. An RC controller as recited in claim 1, wherein the circuitboard includes first and second terminal posts on which the fuse plugs.

4. An RC controller as recited in claim 3, wherein the fuse includes:

first and second connectors that are configured to plug onto the first and second terminal posts with interference fits; and a length of fuse wire connecting the first and second connectors.

5. An RC controller as recited in claim 3, wherein the fuse includes:

a fuse element in the form of a sheet of conductive material shaped to have first and second plug portions connected by a fuse portion;

the fuse portion being configured to electrically connect the first and second plug portions and to blow if the amount of current passing through it exceeds a predetermined rating; and the first and second plug portions being configured to plug onto the first and second terminal posts with interference fits.

6. An RC controller as recited in claim 5, wherein the fuse includes means defining a housing for holding the fuse element in order to facilitate handling of the fuse.

7. An RC controller as recited in claim 6, wherein the fuse is configured so that the fuse element removably mounts in the fuse housing in order that the housing can be reused.

8. An RC controller, comprising:

a circuitboard; and means defining a circuit on the circuitboard for variably coupling power from a battery to the drive motor of a radio controlled motor;

the circuit having an input port that includes a positive input terminal for connection to the positive terminal of the battery and a negative terminal for connection to the negative terminal of the battery;

the circuit having an output port that includes a first and second output terminals for connection to the motor;

the circuit having a first unfused leg electrically coupling the positive input terminal to the first output terminal and a second unfused leg electrically coupling the negative input terminal to the second output terminal;

the circuit having means for varying the resistance of at least one of the first and second unfused legs in order to vary the amount of power coupled from the battery to the motor;

the circuit including means defining braking componentry connected across the output terminals for electrically coupling the output terminals with a low resistance path in parallel with the motor in order to brake the motor under operator control; and the circuit including a pluggable fuse in series with the braking componentry for protecting the braking componentry from damage in the event the input terminals are connected to the battery with the polarity reversed.

9. An RC controller as recited in claim 8, wherein the means for varying the amount of resistance of at least one of the first and second legs in order to vary the amount of power coupled from the battery to the motor includes at least one semiconductor device in series with one of the first and second legs.

10. An RC controller as recited in claim 8, wherein the braking componentry includes at least one semiconductor device connected across the output terminals.

11. A replaceable fuse, comprising:

means defining a conductive element having a predetermined current rating, means defining a first connector connected to the conductive element, which first connector is configured to removably plug onto a first terminal post with an interference fit due to resilient deformation of the first connector; and means defining a second connector connected to the conductive element, which second connector is configured to removably plug onto a second terminal post with an interference fit due to resilient deformation of the second connector;

the first and second connectors being so connected to the conductive element that they are part of the replaceable fuse and configured to unplug from the first and second terminal posts for purposes of replacing the fuse.

12. A fuse as recited in claim 11, wherein the first and second connectors include first and second female connectors and the conductive element includes a length of fuse wire extending between the first and second female connectors, which fuse wire is configured to have the predetermined current rating.

13. A fuse as recited in claim 11, wherein the fuse includes a fuse element in the form of a sheet of conductive material that has been shaped to define the first and second connectors as well as the conductive element interconnecting them.

14. A fuse as recited in claim 13, further comprising means defining a housing for holding the fuse element in order to facilitate handling.

15. A fuse as recited in claim 13, wherein the fuse element is configured to removably snap into the housing in order that the housing can be reused.

* * * * *